United States Patent
Andre

(10) Patent No.: US 8,141,496 B2
(45) Date of Patent: Mar. 27, 2012

(54) DEVICE FOR DETECTING A RISK OF DERAILMENT AND THE RELEASE OF DEBRIS OR OBJECTS ONTO A VEHICLE RAIL GUIDEWAY

(75) Inventor: Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 345 days.

(21) Appl. No.: 12/516,736

(22) PCT Filed: Nov. 28, 2007

(86) PCT No.: PCT/FR2007/001953
§ 371 (c)(1),
(2), (4) Date: Jun. 23, 2009

(87) PCT Pub. No.: WO2008/074942
PCT Pub. Date: Jun. 26, 2008

(65) Prior Publication Data
US 2010/0065692 A1    Mar. 18, 2010

(30) Foreign Application Priority Data
Nov. 29, 2006 (FR) ..................... 06 10435

(51) Int. Cl.
*B61C 11/00* (2006.01)
(52) U.S. Cl. ............... 105/72.2; 105/215.1; 104/244; 246/121
(58) Field of Classification Search ............ 246/121, 246/169 R; 105/72.2, 73, 141, 144, 145; 104/244, 245
See application file for complete search history.

(56) References Cited

U.S. PATENT DOCUMENTS

| | | | | |
|---|---|---|---|---|
| 128,597 A * | 7/1872 | Crew | ............ | 104/120 |
| 5,277,285 A * | 1/1994 | Musachio | ............ | 191/6 |
| 5,704,295 A * | 1/1998 | Lohr | ............ | 105/72.2 |
| 5,960,717 A * | 10/1999 | Andre | ............ | 104/139 |
| 6,029,579 A * | 2/2000 | Andre et al. | ............ | 105/72.2 |
| 6,363,860 B1 * | 4/2002 | Andre | ............ | 105/72.2 |
| 7,193,835 B2 * | 3/2007 | Lohr et al. | ............ | 361/217 |
| 7,228,803 B2 * | 6/2007 | Andre et al. | ............ | 104/244 |
| 2005/0172851 A1 * | 8/2005 | Andre et al. | ............ | 104/244 |
| 2007/0119333 A1 * | 5/2007 | Dupont et al. | ............ | 105/72.2 |
| 2010/0065692 A1 * | 3/2010 | Andre | ............ | 246/121 |

FOREIGN PATENT DOCUMENTS

| | | |
|---|---|---|
| FR | 513 374 | 2/1921 |
| FR | 2 715 119 A1 | 7/1995 |
| FR | 2 759 340 A1 | 8/1998 |
| FR | 2 846 917 A1 | 5/2004 |
| GB | 102 385 | 3/1917 |

* cited by examiner

*Primary Examiner* — S. Joseph Morano
*Assistant Examiner* — Jason C Smith
(74) *Attorney, Agent, or Firm* — Davis & Bujold, P.L.L.C.

(57) ABSTRACT

A sliding body (25) which includes an electrical contact shoe (32) that moves on a guide rail (5) along the length thereof. The sliding body (25) is mounted to the front of a guiding assembly, in the direction of movement of a vehicle, and articulated with the assembly by a connecting rod (26) that is designed to rupture upon exceeding a pre-determined limit. The sliding body (25) includes a device (43), which is located on at least one of the sides of the body, for lifting and releasing objects or debris. The loss of electrical contact between the shoe and the rail enables a risk of derailment to be detected. The invention is suitable for rail-guided vehicle manufactures.

22 Claims, 9 Drawing Sheets

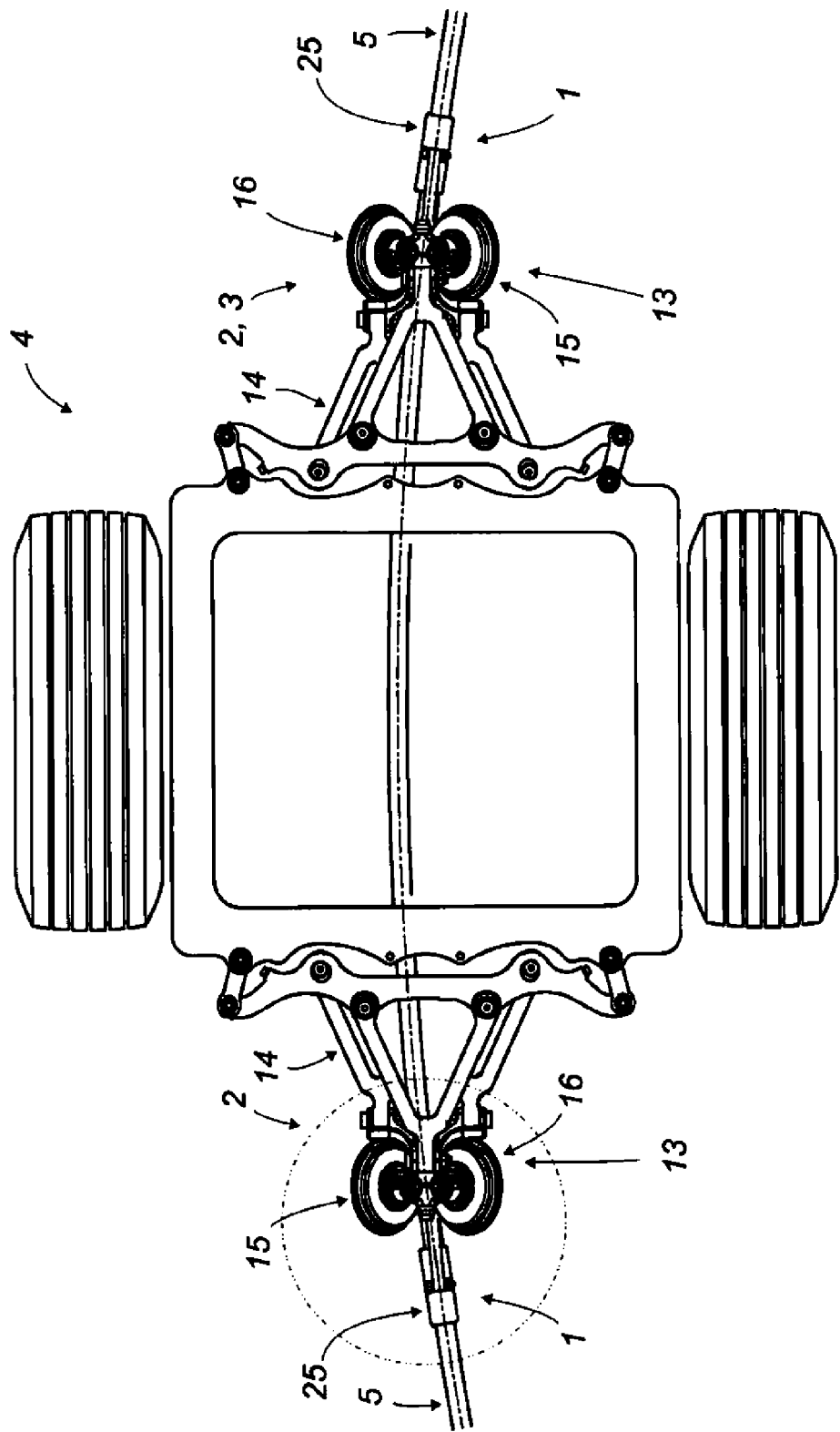

DEVICE FOR DETECTING A RISK OF DERAILMENT AND THE RELEASE OF DEBRIS OR OBJECTS ONTO A VEHICLE RAIL GUIDEWAY

This application is a National Stage completion of PCT/FR2007/001953 filed Nov. 28, 2007 which claims the benefit of French Application Serial No. 0610435 filed Nov. 29, 2006.

FIELD OF THE INVENTION

The present invention relates to a device for detecting the risk of derailment and removing objects or debris, more generally, objects present on the rail guideway for a transport vehicle.

BACKGROUND OF THE INVENTION

The use of a roller guide assembly displaced along a ground rail to guide road vehicles constitutes the ideal urban traffic solution for public transportation road vehicles.

The applicant has invented a unit for guidance along a single guide rail embedded in the ground having two angled rollers applied to the guide rail by a preconstrained force. The performance of this invention is beneficial not only, from the point of view of speed, but also quietness and dependability.

Guide rails embedded into the ground are located in public areas and often the hollow linear grooves formed on either side of the guide rail act as receptacles for the most diverse objects, which may cause operating malfunctions and even lead to derailment.

Other objects obstruct the guide rail by their mere presence across or along the track. The items may consist of various objects ranging from traffic accident debris to lost or abandoned items.

It is also possible for ice to be present in one or more of the grooves extending along the rail, which may constitute a serious obstacle to guidance in the wintertime. Hereinafter, ice will be considered to be an object or an obstacle, or debris in the case of shattered ice.

To prevent derailments caused by objects and debris obstructing the guide rail or lodging in the lateral space or spaces forming in the one or more grooves located along the guide rail, two principal means of evacuating or ejecting debris have already been provided.

The first one is a protective device called a guard iron or "cowcatcher" which generally functions by pushing away objects located on the guide rail.

The second one is a material used to partially fill one or more grooves. This material has elastic properties so it can either retain small objects forced down inside, and possibly becoming encrusted inside as the passing the guide rollers exert pressure, or in some cases, eject them by bouncing them off after the rollers have passed.

However, the fact remains that certain objects blocking the path cause the guide rollers to lift appreciably, which can lead to derailment.

SUMMARY OF THE INVENTION

The object of the present invention is to clear, during travel, numerous objects from the guide rail interfering with passage of the guide rollers. Another object of the invention is to detect risk of derailment and engage warning devices and safety procedures while the guide rollers are still engaged along the guide rail.

To achieve this, the invention relates to a device for releasing objects or debris located along the guide track for a unidirectional or bidirectional vehicle guided by at least one guide rail and for detecting risk of derailment, said device being placed on the extremity of at least one of the guide assemblies moving along said guide rail, characterized in that it comprises:

a sliding body moving on and along said guide rail attached to the front of at least one of the guide assemblies in the direction of movement of the guided vehicle, said sliding body being articulated to the support of at least one guide assembly by a connecting rod, said sliding body having facing at least one free surface of the guide rail, a device for lifting and releasing objects and debris;

at least one electrical contact element contacting the guide rail, which is either integrated with or removable from the sliding body, said electrical contact element being placed in at least one electrical circuit, whose open or closed state is detected by the system controlling the transport vehicle, such that failure of the electrical contact element to contact the guide rail causes a state of the electrical circuit used to identify the existence of a derailment risk.

The device of the invention offers the important feature of ensuring safe guidance by using only simple, economical means that consume little energy.

BRIEF DESCRIPTION OF THE DRAWINGS

Other characteristics and advantages of the invention will be apparent from the following description provided by way of example and accompanied by the drawings, wherein:

FIG. 7 is a longitudinal cross-section of a device wherein the contact shoe consists of two successive blocks;

FIG. 8 is a general illustration of an axle module guided along a curve;

DETAILED DESCRIPTION OF THE DRAWINGS

Figure 1:
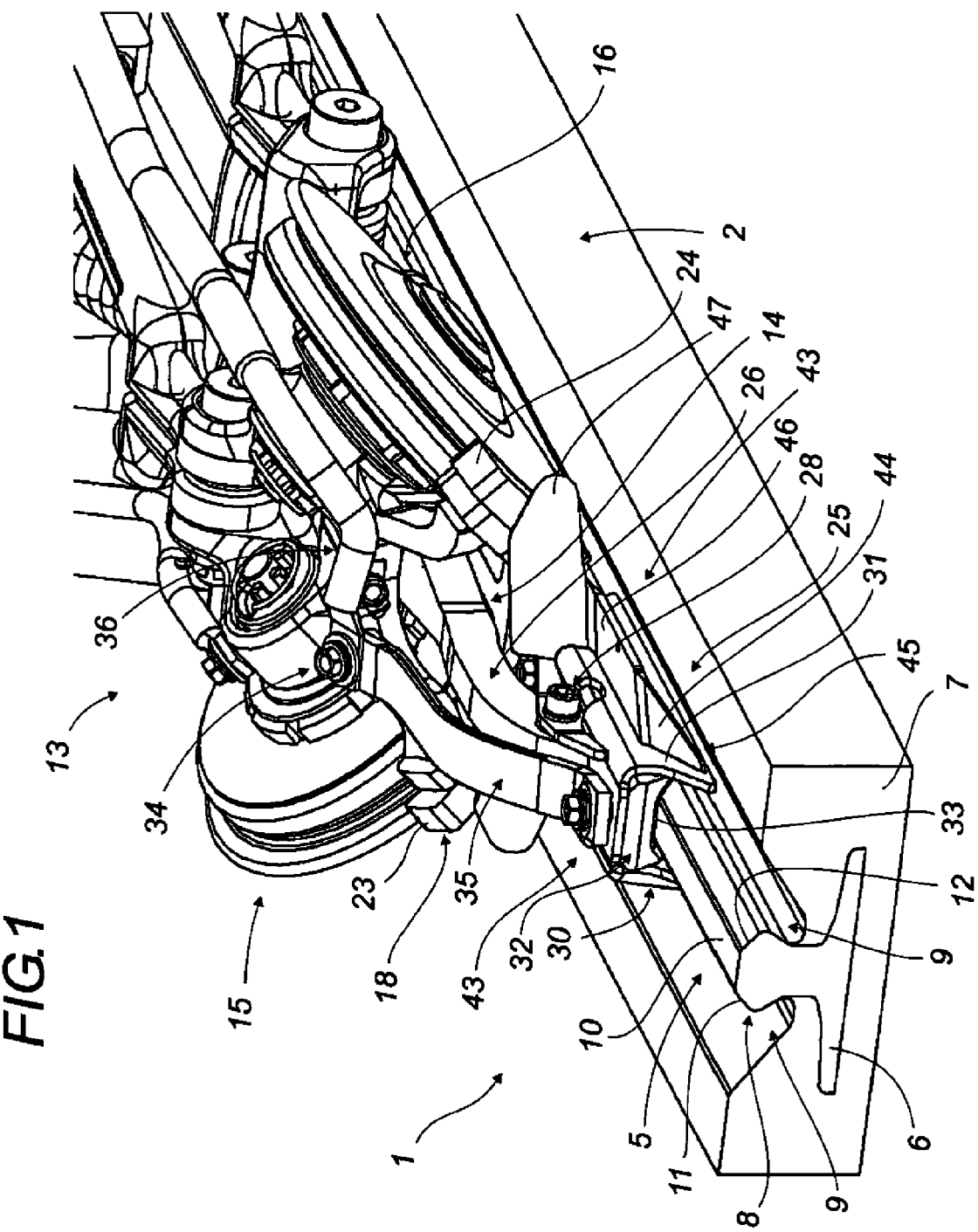
FIG. 1 is a perspective view of the detection and release device according to one embodiment of the invention, a device which is attached to the guide rail and to a guide assembly having two angled rollers.

One exemplary embodiment of the invention will be described below, in conjunction with the drawings, applied to the domain of road vehicles on tires guided by a ground rail. Obviously it has applications to many other situations, specifically dual rail guided travel, and in particular, to a device for detecting derailment risks and clearing objects or debris from the groove of a grooved rail.

Furthermore, the term "objects" denotes any type of natural or artificial obstacles, including those related to the environment, such as meteorological and climatic conditions, for example, ice.

Device 1 of the invention for detecting and clearing objects or debris, more generally obstacles, on the guide track for a vehicle, for example a road transport vehicle, is attached to the front in the direction of movement of at least one guide assembly 2 on an axle which is supported in this particular application by a road transport vehicle, specifically for public urban transportation.

Detection and release device 1 may also be attached to the rear of the rear guide assembly 3 in the case of an axle module 4 on a bidirectional vehicle consequently possessing two guide assemblies 2 and 3 and thus two detection and release devices 1 as shown in FIG. 8. Obviously, only one guide assembly is in service at a time. This is the one facing in the direction of travel.

Guiding takes place along a guide rail 5, for example, a single rail along the ground comprising a base 6 immobilized at the bottom of a channel 7 so that the upper plane of its rail head 8 is level or approximately level with the plane of the road surface in the example shown.

An example of a guide rail 5 is shown in FIG. 1. Its rail head 8 is separated on either side of the channel edges by hollow or grooved linear spaces such as space 9, and has an upper plane with a plane median portion 10 and two symmetrical angled paths 11 and 12 to accommodate movement of the two guide rollers.

Each groove 9 constitutes a potential receptacle for objects and debris that may interfere with guide rail function.

In the example shown, the guide assembly 2 or 3 comprises a guide head 13 articulated to a support 14 supported in the front and in the case of a bidirectional vehicle, also at the rear of axle module 4.

Guide head 13 is formed of two symmetrical rollers 15 and 16 angled in a downward-pointing V. These guide rollers are attached to a roller bearing support 17. They are each engaged in roll motion by a certain contact pressure on one of the angled paths on the rail, 11 and 12, respectively.

At the front of guide head 13 there is attached on roller bearing support 17 a pushing safety shield 18 formed of two symmetrical flanges 19 and 20 opening in a V centered on guide rail 5. These flanges 19 and 20 are curved towards the exterior and comprise at their extremities reinforced front surfaces 21 and 22 each terminating in a transverse evacuation piece 23 and 24, extending upward in front of rollers 15 and 16 to protect them.

Each front surface of this safety shield 18 constitutes a pushing wall that diverges so as to force objects or debris laterally toward the exterior, more generally, obstacles that reach its level, in order to clear them from the guide track.

On this same roller bearing support 17, a sliding body 25, sliding along guide rail 5, is attached at the front and at a distance from guide head 13. "At the front" means preceding the vehicle in the direction of travel. It is articulated at a distance at the front of guide head 13 by means of a mechanical connection, for example, a connecting rod 26. This connecting rod 26 is connected first, at one extremity to roller bearing support 17, preferably using a pivoting articulation 27, for example, with lateral clearance. It is also connected to sliding body 25 on detection and release device 1 by a second articulation 28, preferably a pivoting articulation that also may have lateral clearance.

Articulations 27 and 28 are preferably articulations that pivot about an axle transverse to guide rail 5.

An elastic preconstrained downward force is applied on sliding body 25 of detection and release device 1 through the use of a pressure spring 29 attached between the front of roller bearing support 17 and connecting rod 26. Connecting rod 26 is considered to be like a fuse because it is predisposed to break, i.e., it has properties or it is constituted of materials or elements or formed of a combination of means or of materials and means producing the same effect as a fuse, that is, mechanical destruction beyond a certain threshold force, for example a longitudinal force. For example, it may be made of a material that breaks at a certain predetermined mechanical force, specifically a thrust at a certain value limit. It is flexible, that is, it can be deformed to allow sliding body 25 to follow the guide rail along curves.

Alternatively, connecting rod 26 is flexible, with lateral clearance in a horizontal plane. In the opposite case, pivoting articulations 27 and 28 allow clearance around a vertical axle perpendicular to the rail.

Sliding body 25 is a block or a mechanical unit bridging guide rail 5 and sliding on and along it.

It may be a monoblock or a composite, that is, formed of several portions. Functionally, it holds or comprises an electrical contact with the guide rail and it is equipped with at least one device for lifting and clearing debris and objects from the guideway.

The electrical contact may be housed inside sliding body 25 and it may be integrated with it or removable.

The following description, which is in no way limiting, concerns the two exemplary embodiments shown in the drawings.

Figure 2:
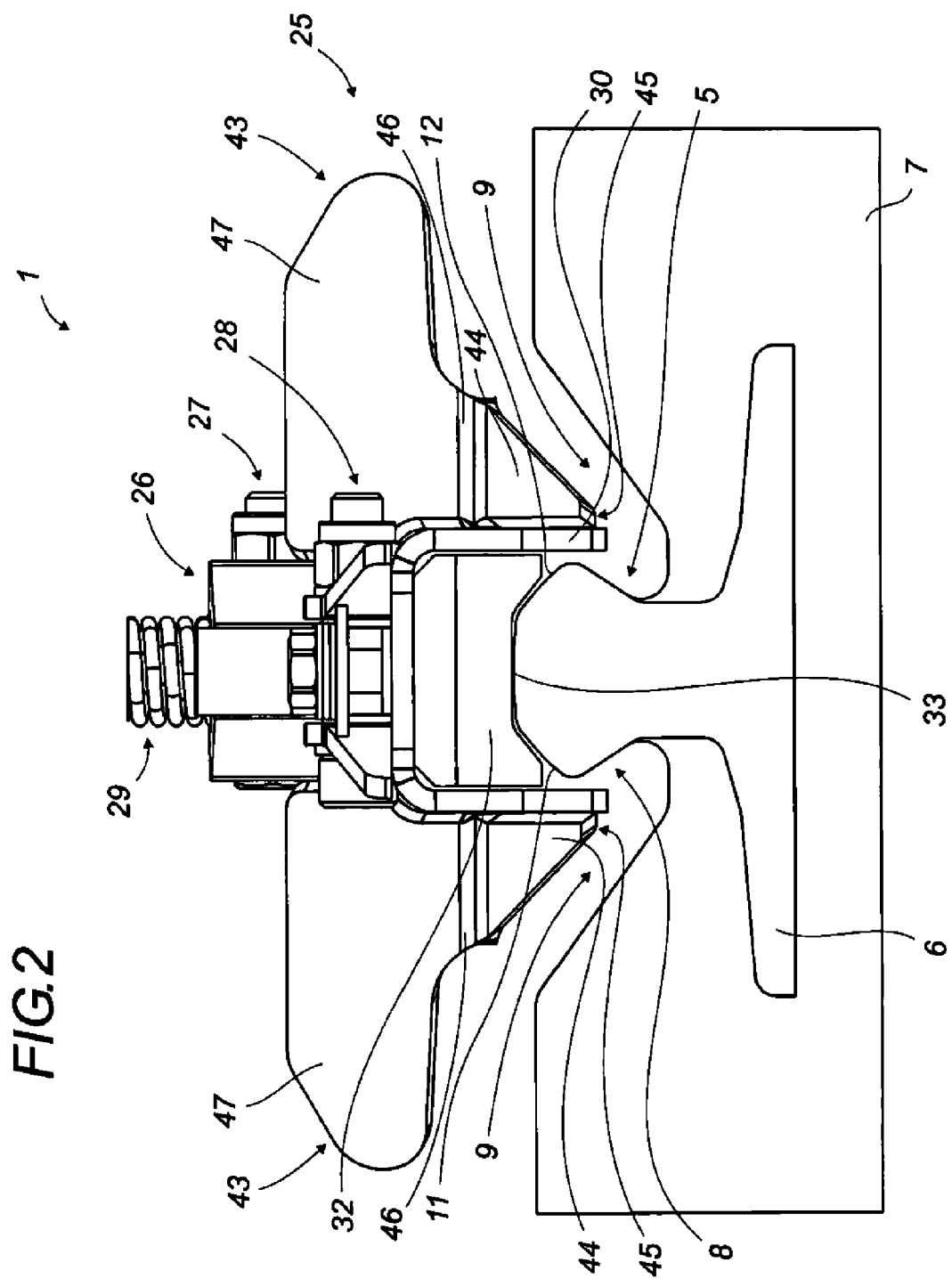
FIG. 2 is a simplified elevation of the detection and release device of FIG. 1 attached to a guide rail.

In the example shown in FIGS. 1 and 2, sliding body 25 consists of a tubular element 30 partially enveloping the guide rail on the lateral surfaces of its rail head 8 with its body having on either side descending arms 31 facing the rail and slightly separated from the rail.

As shown in FIGS. 1 and 2, inside tubular element 30, on the lower surface of its upper portion, there is a contact shoe 32 which is either integrated with it or removable and for example dismountable, serving as an electrical contact element with the rail. Its lower surface 33 preferably has the same profile as the upper portion of guide rail 5, thereby ensuring already a guiding function along the rail.

The foregoing is a description of a mechanical unit incorporating a contact shoe and a sliding body 25 with the one or more lifting and clearance devices. It is possible for the one or more shoes and sliding body 25 to be physically and/or functionally separated from the one or more lifting and clearance devices.

Electrical contact shoe 32 forms part of an electrical derailment risk detection circuit equipping the vehicle to engage, as needed, warning and safety devices and procedures, while the guide rollers are still engaged on the guide rail.

Contact shoe 32 is electrically connected to a point of electrical continuity 34 by a flexible electric connection 35, for example, a braided conductive element that is deformable in order to follow the movements of sliding body 25. The electric detection circuit continues from the point of electrical continuity 34 to the transport vehicle through a connecting electrical cable 36.

As shown below, failure of contact shoe 32 of detection and release device 1 to make electrical contact with guide rail 5 corresponds to an electrical circuit state being called open circuit state, which is used as an alarm by the detection circuit on the transport vehicle in relation with its central operating control system for regulating safe motion and consequently, safe transportation.

Contact shoe 32 on sliding body 25 is formed as a monoblock or a composite, for example, in two parts. An example of the two-part construction is shown in the cross-section in FIG. 7.

According to this embodiment, the two conductive blocks forming shoes 37 and 38 that constitute it, are separated by an empty space 39 or occupied by an electrically insulated insert of the appropriate thickness.

Block 37 is larger in size because it is electrically connected to a high amperage return circuit.

These two electrically conductive blocks forming a composite contact shoe are used as two contact shoes 37 and 38, one following the other, but are mechanically and electrically disassociated. They are mechanically maintained and assembled so as to maintain their electrical individuality as separate conductive blocks.

The two mechanical blocks forming contact shoes 37 and 38 are each connected electrically and protected by an appropriate electrical insulation 40 to a circuit or to several specific separate circuits by a separate electrical connection 41 and 42. Electrical connection 41 corresponding to first contact shoe 37 is larger in section because of the stronger amperage that must or may pass through it.

Therefore, it is preferably through this shoe 37 that the vehicle supply current returns.

Two groups are distinguished between the possible circuits: one for electrical functions and the other for controls.

There may also be circuits dedicated to safety surveillance, electrical continuity of the rail and the state of electricity supply to the vehicle and supply circuits, and various circuits for several types of signals and functions.

When sliding body 25 is in contact with guide rail 5 through the intermediary of its two contact shoes 37 and 38, the shoes form three possible circuits. One is between the first contact shoe 37 and the rail, another between the second contact shoe 38 and the rail, and a third between the two shoes, with electrical continuity being ensured by the simultaneous contact of the two contact shoes with the rail. This provides the benefit of three electrical pathways able to be interrupted.

These are useful possibilities not only for the operating controls, but especially for safety in guiding the vehicle.

Depending on the situation, that is, the extent to which the sliding body is raised, one or more electrical continuities may be interrupted, that is, the electrical continuity between one of the shoes and the rail, or between the shoes themselves. Therefore, at least one of these two circuits is open.

In actuality, it is only necessary for the contact surface of one or the other of the two shoes 37 or 38 to separate by lifting diagonally or in another direction relative to guide rail 5 in order for the derailment risk detection circuit to open and be noticed. The open circuit will be taken into account by the vehicle's central control and transportation safety system.

One of the detection circuits, or the detection circuit for engaging preventative safety measures, may be formed of a fixed track installation, for example, a fixed track generator emitting a frequential electrical signal between the overhead contact line carrying driving electrical energy and the rail. This signal reaches the vehicle through the guide rail and may also reach it through the overhead contact line; it is analyzed or detected inside the vehicle by a detection module adapted for this purpose. If the signal is not received, then the shoe has become raised. Preventive safety precautions are then taken, such as emergency braking or whatever action the situation warrants.

Figure 10:
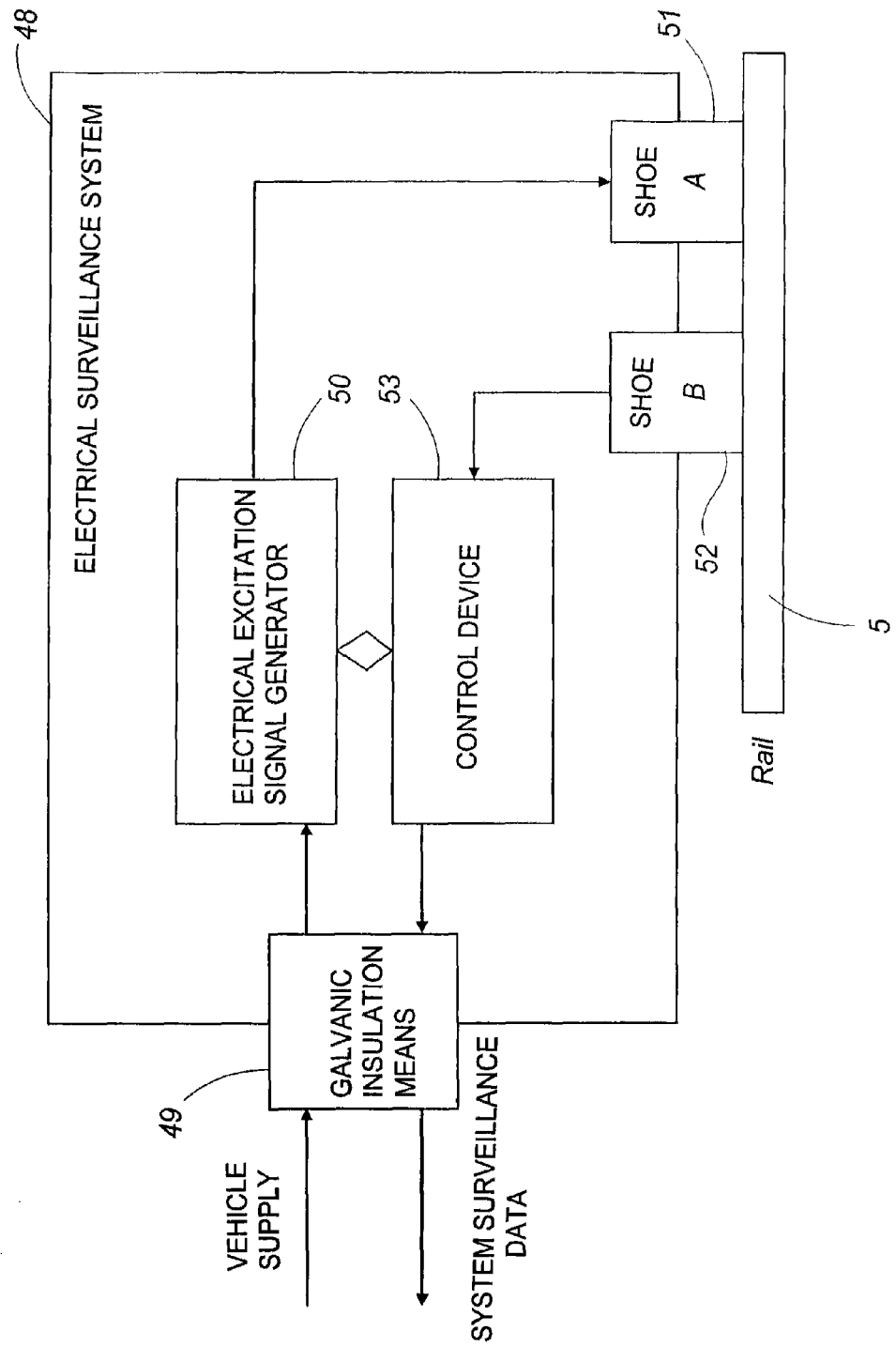
FIG. 10 is a block schema showing the general operational principle of one particular example of the safety detection circuit.

The one or more detection circuits may also consist of equipment on the vehicle. A non-limiting example of such a detection circuit has been shown schematically in FIG. 10 in order to more completely illustrate the invention.

This detection circuit allows the electrical contact to be controlled between the shoes attached to the vehicle and the guide rail.

At least two shoes are necessary for operation of the circuit, consistent with the variation shown in FIG. 7, for example, comprising two conductive blocks forming contact shoes 37 and 38 separated by an empty space 39 or occupied by an electrically insulated layer of suitable thickness. However, this detection circuit may be adapted to any other embodiment comprising at least two shoes in contact with the guide rail, whether they be electrical ground shoes or current return shoes.

In order to ascertain the condition of the shoes relative to the guide rail, that is, to determine whether or not they are in electrical contact with it, a reference is created. To do this, a control loop is created within an electronic surveillance system 48. In this loop, guide rail 5 represents the ground from an electrical perspective.

The vehicle furnishes the energy necessary to operate the electronic surveillance system 48. This energy must be electrically insulated from the ground and thus from guide rail 5. Surveillance system 48 is thus galvanically insulated from the vehicle by means of a galvanic insulator 49.

Electronic surveillance system 48 comprises a generator of electrical excitation signals 50. This generator transmits an electrical frequential excitation signal to a first shoe 51, called "Shoe A" in FIG. 10.

In a normal operating situation, Shoe A is electrically connected with a second shoe 52, called "Shoe B," through guide rail 5.

Electronic surveillance system 48 also comprises a control device 53 connected to shoe B that verifies whether the electrical excitation signal emitted by generator 50 is successfully transmitted to it by means of shoe B through Shoe A and guide rail 5.

If control device 53 does not receive the electrical excitation signal, this indicates that the electrical circuit is interrupted because at least one of shoes 51 or 52 has become raised or because of a defect in the portion of guide rail 5 between the two shoes.

Control device 53 transmits data on the condition of surveillance system 48 to the general vehicle control and transportation safety system which, depending upon the situation, may engage preventative safety measures such as emergency braking, for example, if a failure is indicated.

Advantageously, surveillance system 48 can detect the complete detachment of each shoe independently of the condition of the other shoe. Therefore, it is not necessary for both shoes to be raised in order for the system to detect failure. Similarly, surveillance system 48 may detect an interruption in the electric circuit between the two shoes 51 and 52, that is, a defect in the portion of guide rail 5 that is situated between the two shoes.

According to a preferred embodiment, the electronic surveillance system 48 described above may be located in a compact housing attached above shoes 51 and 52 on sliding body 25.

The other principal function of the sliding body is the clearance of debris and objects located along the guideway.

For this purpose, sliding body 25 is generally shaped like a plow, with a plunging front extremity that is enlarged towards the back.

Sliding body 25 has on either side a succession of deflectors, each of which forms on either side with each flank 31 of sliding body 25 a lateral evacuation ramp 43.

Each lateral lifting and clearance ramp 43 is composed of an upright angled lifting deflector 44 with a plunging lower tip 45, which deflector is followed by a horizontal plate 46, said ramp terminating in a transverse lateral ejection deflector 47 in the form of a transverse wall aimed diagonally toward the exterior.

Figure 3:
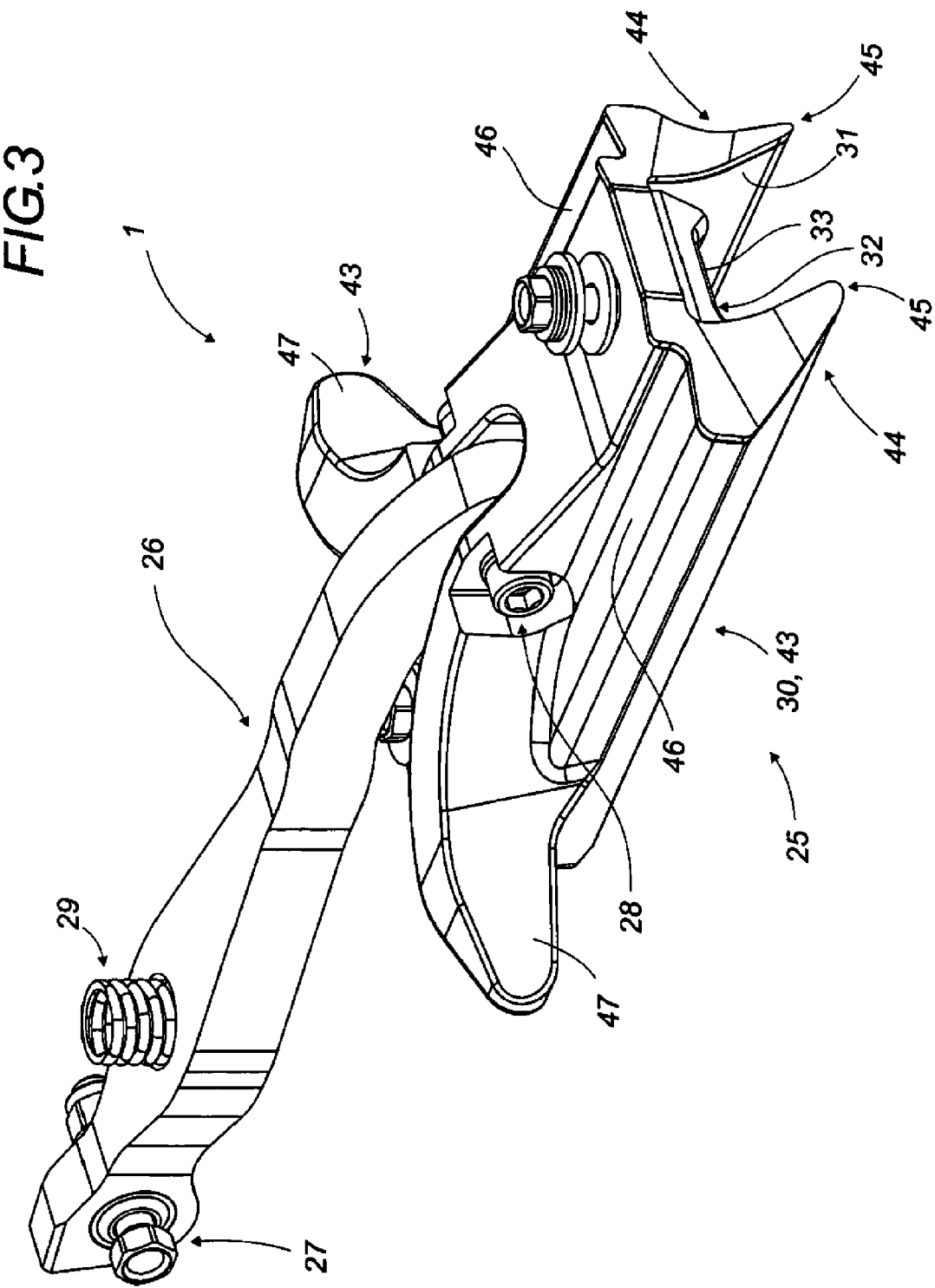
FIG. 3 is a simplified perspective view of a variation of the detection and release device of the invention.
Figure 4:
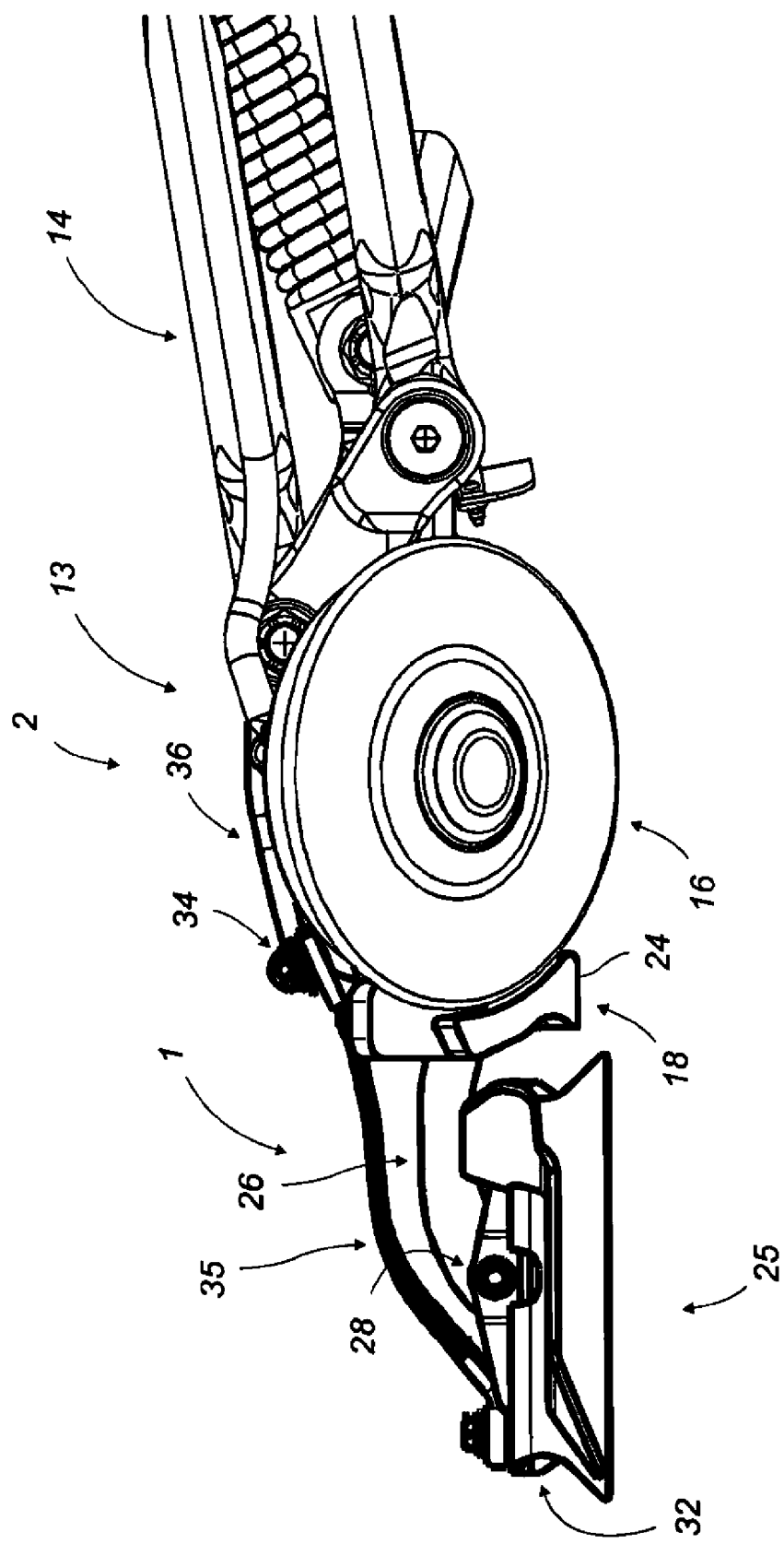
FIG. 4 is a profile view of the device shown in FIG. 1 and the guide assembly to the front of which it is attached.
Figure 5:
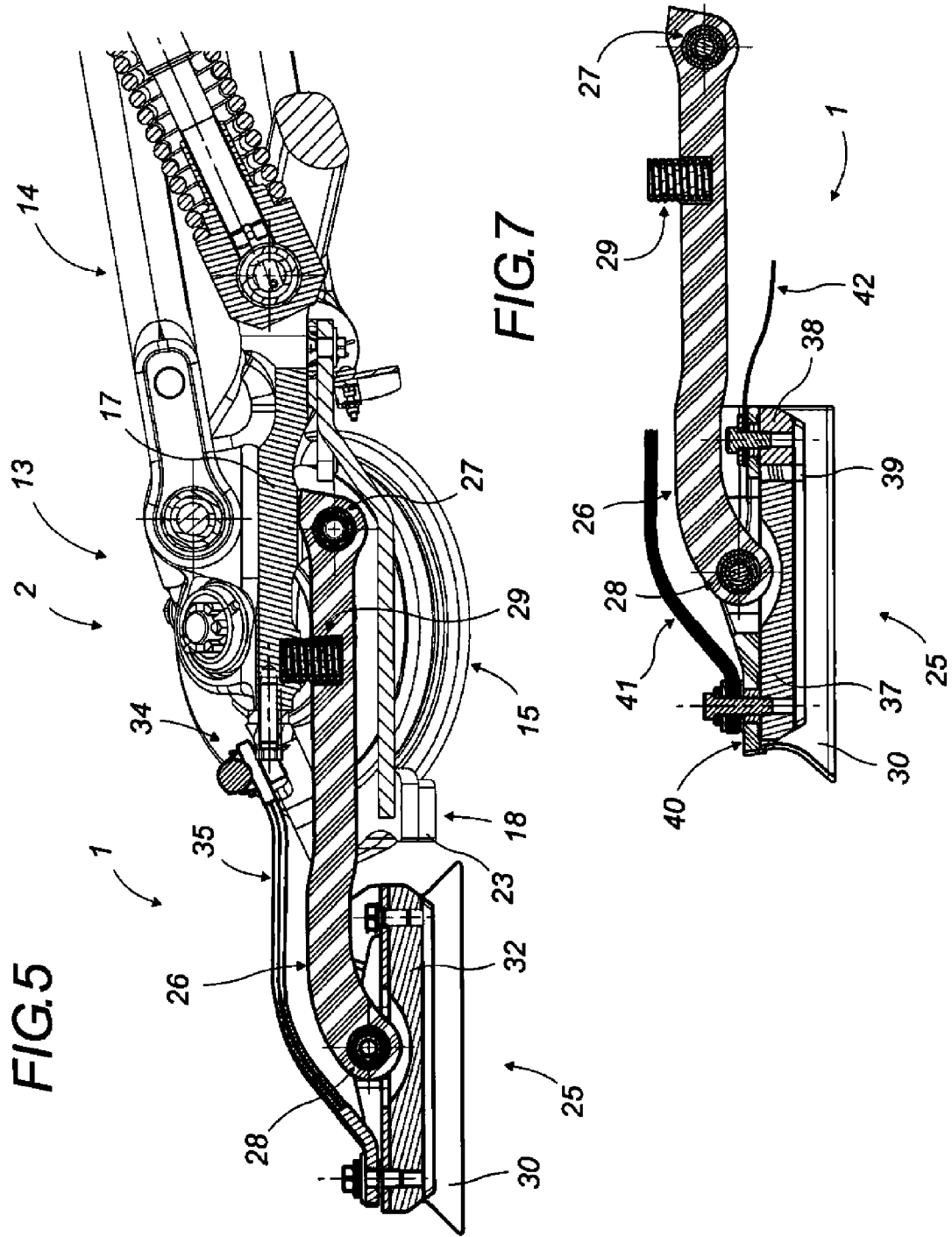
FIG. 5 is a longitudinal vertical cross-section of the same assembly.
Figure 6:
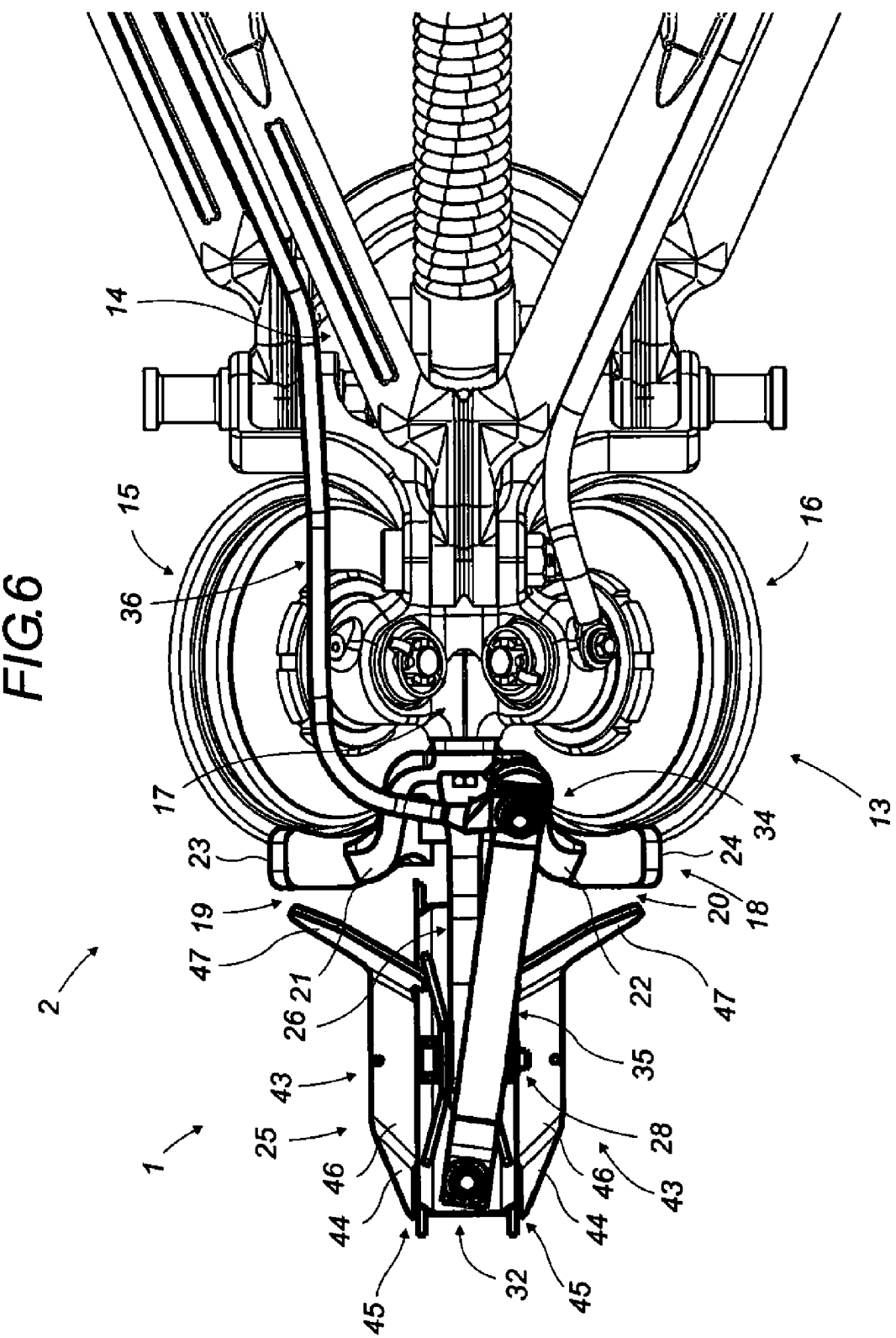
FIG. 6 is a plane view of the same assembly.

The variation shown in FIG. 3 has the same general characteristics as those previously described. It is a more compact variation in which ramps 43 and tubular element 30 are integrated in the same mechanical unit, that is, these elements may be made of a single piece, such as, for example, bended sheet metal.

The degree of mechanical fragility, that is, the predisposition of connecting rod 26 which supports the sliding body to break, is dictated principally by the imperative causing connecting rod to break, specifically by raising, in order to prevent the guide rollers from being lifted so far up that they leave the sides of the guide rail.

The device of the invention behaves like a fuse which breaks in order to interrupt the mechanical connection to the support it is attached to if subjected to excessive force caused by resistance to displacement of object or debris blocked on the guideway.

In addition, because of the lateral clearance in pivoting articulations 27 and 28 connecting rod 26 to roller bearing support 17 and also, or because, it may be flexible, the sliding body can perfectly and easily follow the rail at all times along curves. This provides the benefit of progressive decentering and then automatic realignment, thus avoiding damage to the guide unit or causing an operational malfunction of the unit that could lead to derailment.

Figure 9:
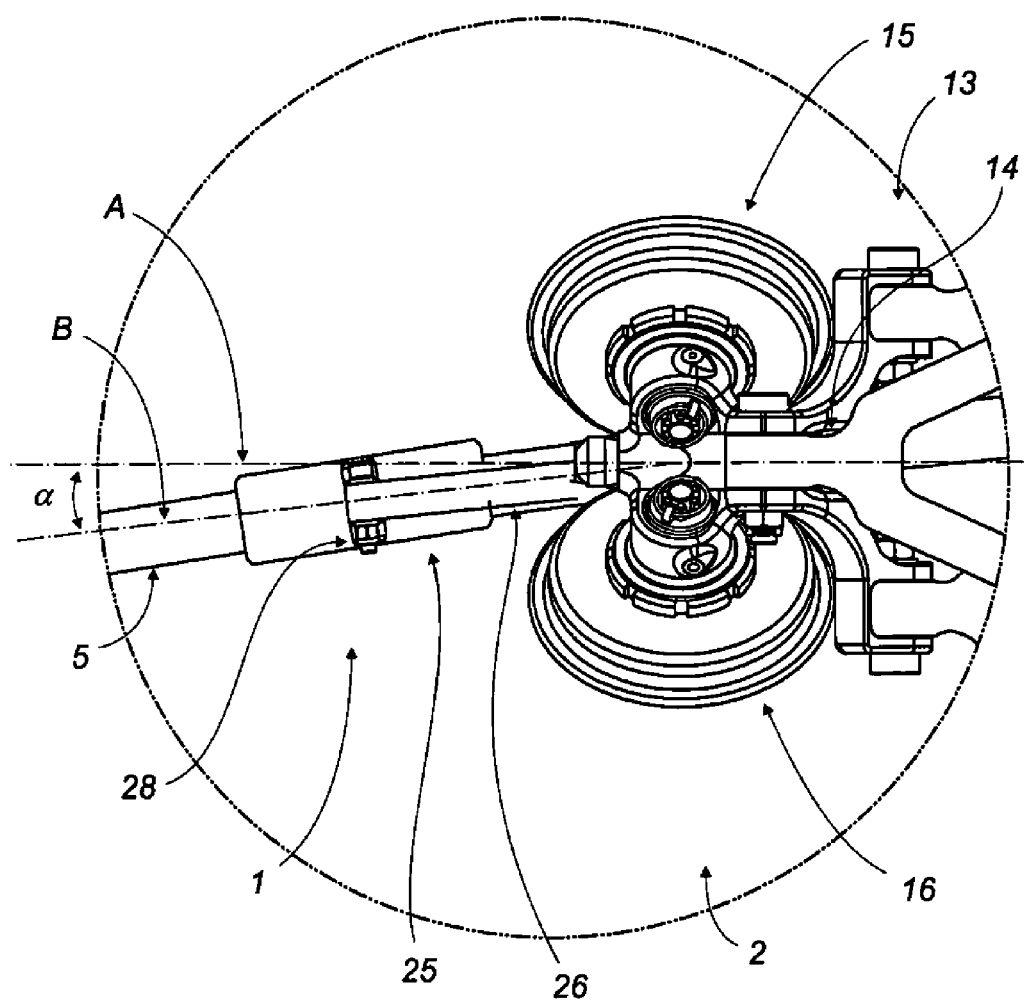
FIG. 9 is an enlargement of the circled portion of FIG. 8 showing the decentering action that the invention makes possible along curves between the guide assembly and the detection and release device.

This feature is illustrated by FIGS. 8 and 9 showing an axle module 4 with two guide units, front unit 2 and rear unit 3, each associated with a detection and release device according to the invention. This dual guide head unit is found on bidirectional vehicles. The longitudinal axes of a guide assembly and of a detection and release unit, A and B, respectively, form an angle of intersection "a" on curves thereby ensuring that sliding body 25 is correctly guided because of the flexibility of the connecting rod and/or the lateral clearance in the pivoting articulations.

The general operation is very simple.

Small objects or debris remain underneath sliding body 25 without affecting motion.

With other objects or debris that may be larger, lateral ejection ramps 43 fulfill their clearing function. The objects or debris reach the deflectors due to the action of the angled and horizontal plates, and are pushed laterally towards the exterior of the track by the advancing motion of the guide assembly.

With large objects, debris, or the like representing a serious obstacle and a probable cause of derailment, sliding body 25 lifts up when it passes over the obstacle; when it exceeds a certain threshold of mechanical force predetermined during construction, connecting rod 26 breaks, acting as a fuse. Sliding body 25 leaves the rail, triggering detection of a derailment risk, while the guide rollers are still engaged on the rail.

Below this breaking threshold of connecting rod 26, the rod may also lift when passing over one or more obstacles, which likewise triggers raising of the shoe and thus detection of derailment risk.

Obviously if the obstacle is too voluminous, the front of sliding body 25 will strike it forcefully and then connecting rod 26 will break.

The detection and release device 1 according to the invention ensures in nearly all cases that the transport vehicle is safely guided and controls stopping of the vehicle to avoid consequential damages.

The invention claimed is:

1. A device for clearing objects and debris along a guide rail for either an unidirectional or a bidirectional vehicle guided by at least one guide rail (5) and for detecting risk of derailment, the device being placed at an extremity of at least one guide assembly (2, 3) moving along the guide rail (5), for either the unidirectional vehicle or the bidirectional vehicle, wherein the detection and clearance device comprises:
   a sliding body (25) moving on and along the guide rail (5) is attached to a front of the at least one guide assembly (2, 3) in a direction of movement of the guided vehicle, the sliding body (25) is articulated to a support for the at least one guide assembly (2, 3) by a connecting rod (26), the sliding body (25) has at least one free surface of the guide rail (5) facing a device for lifting and clearing objects and debris;
   at least one element for electrical contact with the guide rail (5) is either integral with or removable from the sliding body (25), the electrical contact element is located in at least one electrical circuit, either an open or a closed state of the electrical circuit is detected by a transport vehicle control system such that failure of the electrical contact element, to contact the guide rail (5), causes the state of the electrical circuit used to identify existence of a risk of derailment; and
   the connecting rod (26) being predisposed to break beyond a point at which a certain predetermined force is exerted on the sliding body (25).

2. The detection and clearance device according to claim 1, wherein the connecting rod (26) is flexible.

3. The detection and clearance device according to claim 2, wherein the connecting rod (26) is flexible with lateral clearance in the horizontal plane.

4. The detection and clearance device according to claim 1, wherein the connecting rod (26) is articulated by a first articulation (27) to a support forming part of the guide assembly (2, 3) and by a second articulation (28) to the sliding body (25).

5. The detection and clearance device according to claim 4, wherein each of the first and the second articulations (27, 28) is pivoting articulation.

6. The detection and clearance device according to claim 5, wherein each of the first and the second articulation (27, 28) is an articulation pivoting on a vertical axle perpendicular to the guide rail (5).

7. The detection and clearance device according to claim 5, wherein at least one of the pivoting first and the second articulations (27, 28) allows lateral clearance.

8. The detection and clearance device according to claim 7, wherein the connecting rod (26) is attached with a downward restoring force by virtue of a pressing force from the sliding body (25) on the guide rail.

9. The detection and clearance device according to claim 8, wherein the pressing force is an elastic force.

10. The detection and clearance device according to 4, wherein each of the first and the second articulations (27, 28) is an articulation pivoting on an axle transverse to the guide rail (5).

11. The detection and clearance device according to claim 1, wherein the electrical contact is a contact shoe (32) housed in the sliding body (25), and either a lower edge or a lower surface (33) of the contact shoe (32) rests on an upper surface of the guide rail (5).

12. The detection and clearance device according to claim 11, wherein the electrical connection between the contact shoe (32) and a point of electrical continuity on the support for the guide assembly (2, 3) is a flexible electric connection (35).

13. The detection and clearance device according to claim 1, wherein the electrical contact element of the sliding body (25) is made as two successive sliding blocks forming first and second contact shoes (37, 38) which are separated by either an empty space or an electrically insulating layer (39), each of the first and second contact shoes is electrically connected to an electrical connection (41, 42) such that the electrical contacts of the first and second contact shoes with the guide rail (5) form at least two electrical circuits, the guide rail (5) forming an electrical continuity when the first and second contact shoes simultaneously contact with the guide rail (5), firstly between each of the first and second contact shoes (37, 38) and the guide rail, and secondly, between the two contact shoes (37, 38).

14. The detection and clearance device according to claim 13, wherein the first contact shoe (37) is larger in size than the second contact shoe (38).

15. The detection and clearance device according to claim 13, wherein the at least two circuits comprise:
the first contact shoe (37) or one of a supply return circuit, or a group of circuits concerning supply and control; and
the second contact shoe (38), a detection circuit for control and safety of movement, or a group of circuits for the control and safety of movement.

16. The detection and clearance device according to claim 1, wherein at least one of the electrical circuits comprises a device attached to a track which generates a frequent signal passing through the guide rail (5) and a contact of a contact shoe with the guide rail to a receptor on the vehicle which either detects the signal, if the contact shoe contacts the guide rail, or does not detect the signal if the contact shoe fails to contact the guide rail, in order to launch actions relating to safety of passengers and material being transported by the vehicle.

17. The detection and clearance device according to claim 1, wherein the lifting and release device is supported on at least one side of the sliding body (25) and comprises a lateral lifting and clearing ramp (43) formed by an upright angled lifting deflector (44), preceded by a plunging tip (45) and followed either by a horizontal plate (46) or platform and terminating in a transverse deflector (47) in the form of a diagonal wall for laterally clearing the debris.

18. The detection and clearance device according to claim 1, wherein detection and clearance device is coupled at a front and a rear, respectively, of each of front guide assembly (2) and rear guide assembly (3) of an axle module (4) on a bidirectional vehicle.

19. The detection and clearance device according to claim 1, wherein the vehicle is a public urban road transport vehicle and the guide rail is a single ground rail along which the at least one guide assembly travels.

20. The detection and clearance device according to claim 19, wherein the guide assembly is an assembly with two angled rollers (15, 16).

21. A device for clearing objects and debris along a guide rail for either an unidirectional or a bidirectional vehicle guided by at least one guide rail (5) and for detecting a risk of derailment, the device being placed at an extremity of at least one guide assembly (2, 3) to be moved along the guide rail (5) for either the unidirectional vehicle or the bidirectional vehicle,
wherein the detection and clearance device comprises:
a sliding body (25), for moving on and along the guide rail (5), is attached to a front of the at least one guide assembly (2, 3) in a direction of movement of the guided vehicle, the sliding body (25) is articulated by a connecting rod (26) to a support for the at least one guide assembly (2, 3), the sliding body (25) has at least one free surface of the guide rail (5) which faces a device for lifting and clearing objects and debris; and
at least one element, for electrical contact with the guide rail (5), is either integral with or removable from the sliding body (25), and the electrical contact element is located in at least one electrical circuit and either an open or a closed state, of the electrical circuit, is detected by a transport vehicle control system such that failure of the electrical contact element, to contact the guide rail (5), causes the state of the electrical circuit used to identify existence of a risk of derailment; and
at least two electrical contact elements contacting the guide rail (5) in the form of at least two contact shoes (51, 52) placed in an electric detection circuit comprising an onboard electronic surveillance system (48), supplied by the vehicle and galvanically insulated from the vehicle and comprising an electrical excitation signal generator (50) and a control device (53) joined in a control loop through the two contact shoes (51, 52) and the guide rail (5), the control device (53) signaling the vehicle management system if the control device (53) fails to receive the electrical excitation signal transmitted by the electrical excitation signal generator (50).

22. A device for clearing objects and debris along a guide rail for either an unidirectional or a bidirectional vehicle guided by at least one guide rail (5) and for detecting a risk of derailment, the device being placed at an extremity of at least one guide assembly (2, 3) to be moved along the guide rail (5) for either the unidirectional vehicle or the bidirectional vehicle,
wherein the detection and clearance device comprises:
a sliding body (25), for moving on and along the guide rail (5), is attached to a front of the at least one guide assembly (2, 3) in a direction of movement of the guided vehicle, the sliding body (25) is articulated by a connecting rod (26) to a support for the at least one guide assembly (2, 3), the sliding body (25) has at least one free surface of the guide rail (5) which faces a device for lifting and clearing objects and debris; and
at least one element, for electrical contact with the guide rail (5), is either integral with or removable from the sliding body (25), and the electrical contact element is located in at least one electrical circuit and either an open or a closed state, of the electrical circuit, is detected by a transport vehicle control system such that failure of the electrical contact element, to contact the guide rail (5), causes the state of the electrical circuit used to identify existence of a risk of derailment; and
the support for the guide assembly comprises at an extremity a safety shield (18) forming two flanges (19, 20) that are symmetrical relative to the longitudinal axle of the guide assembly (2, 3), the two flanges are arranged in a V-shape that is centered on an axle of the guide rail, and each of the two flanges is curved towards the exterior and comprises at the extremity a reinforced front surface (21, 22) each terminating in a transverse release piece (23, 24) protecting the guide rollers (15, 16), respectively.

* * * * *